United States Patent [19]
Potter

[11] Patent Number: 5,608,884
[45] Date of Patent: Mar. 4, 1997

[54] COMMONLY HOUSED MULTIPLE PROCESSOR TYPE COMPUTING SYSTEM AND METHOD OF MANUFACTURING THE SAME

[75] Inventor: Bruce Potter, Austin, Tex.

[73] Assignee: Dell USA, L.P., Austin, Tex.

[21] Appl. No.: 443,274

[22] Filed: May 17, 1995

[51] Int. Cl.$^6$ ............................................. G06F 13/00
[52] U.S. Cl. ............................ 395/309; 395/308; 395/310
[58] Field of Search .................................... 395/308, 309, 395/310

[56] References Cited

U.S. PATENT DOCUMENTS

| | | | |
|---|---|---|---|
| 5,230,065 | 7/1993 | Curley et al. | 395/200 |
| 5,309,567 | 5/1994 | Mizukami | 395/325 |
| 5,327,570 | 7/1994 | Foster et al. | 395/800 |
| 5,448,703 | 9/1995 | Amini et al. | 395/290 |

*Primary Examiner*—Jack B. Harvey
*Assistant Examiner*—John Travis
*Attorney, Agent, or Firm*—Haynes and Boone, L.L.P.

[57] ABSTRACT

A multiple processor type computing system and an associated method of manufacturing the same from first and second computer systems, each of which include a PCI bus and both a processor and LAN device coupled to the PCI bus, which are selected such that the processors of the computer systems are configured to execute software utilizing different operating systems. Each LAN device is installed on the PCI bus using a PCI interface and is comprised of a data register, a data FIFO and a LAN controller coupled together using internal circuitry. Also coupled to the internal circuitry is a serial I/O port used to connect the LAN device to a network. From these, a multiple processor computing system is manufactured by removing the serial I/O port from each of the LAN devices to expose the internal circuitry thereof. The internal circuitry of the LAN devices are then interconnected to couple the first and second processors in a single multiple processor computing system which is supportably mounted in a common computer chassis. The data register and data FIFO of the first LAN device holds selected address, data and control signals during transfers from the first processor to the second processor arranged by the LAN controller of the first LAN device while the data register and data FIFO of the second LAN device holds selected address, data and control signals during transfers from the second processor to the first processor arranged by the LAN controller of the second LAN device.

8 Claims, 2 Drawing Sheets

COMMONLY HOUSED MULTIPLE PROCESSOR TYPE COMPUTING SYSTEM AND METHOD OF MANUFACTURING THE SAME

BACKGROUND OF THE INVENTION

1. Field of the Invention

The present invention generally relates to a multiple processor type computing system and, more particularly, to a multiple processor type computing system which uses modified LAN connection circuitry to interconnect multiple processors within a common computer housing.

2. Description of Related Art

It has long been appreciated that significant advantages, particularly in the area of processing capability, are derived by interconnecting one or more processor subsystems. In the past, however, processor interconnectivity has primarily been contemplated in connection with multiprocessing or parallel processing environments. Multiprocessing is the simultaneous processing of two or more portions of the same program by two or more processor subsystems. Parallel processing, on the other hand, is the use of concurrency in the operation of a computer system to increase throughput, increase fault tolerance, or reduce the time needed to solve particular problems. Typically, concurrency is increased by the use of either pipelining, whereby an operation is divided into multiple stages to be performed by separate processor subsystems, or parallelism, whereby, like multiprocessing, multiple processor subsystems are used to perform a single task.

Recently, considerable attention has been focussed on interconnecting various independent computer systems into a network. One such interconnection of plural computer systems is achieved by use of a local area network (or "LAN"). For example, a LAN may be used to support a range of professional, scientific, engineering, and/or administrative workstations requiring communal access to shared information storage and processing facilities and/or the interchange of documents.

While geographically constrained, the LAN has numerous advantages, including its provision for direct interconnection between the various computer systems or other devices placed in the LAN. Accordingly, the LAN avoids many routing problems which characterize other types of networks. Furthermore, since there are no switching elements or buffers in the network, the only network resource for which computer systems placed in the network have to contend is the transmission medium itself. Of course, such a computer system will also have to contend for the attention of the other computer systems or other devices with which it wishes to communicate. However, all such contention and associated buffering takes place in the computer systems and/or the devices themselves and not the network.

Various techniques may be used to attach a computer system to a LAN. One technique would be to interconnect the computer system to the LAN through the computer's serial port. Such a LAN is commonly referred to as an RS-232 or zero slot LAN. While relatively inexpensive, RS-232 LANs are characterized by relatively slow data rates, typically on the order of 150 kb/s per second, and are suitable only for small offices that have only a few workstations. Another technique utilizes a specially designed adapter card which is inserted in an available slot on the expansion bus of the computer system. While the additional circuitry adds to the cost of installing the LAN, the increased data rates, typically on the order of 10 mb/s per second, make such LANs preferable over RS-232 LANs.

The ever increasing numbers and types of computer systems have led to various attempts to use computer systems interconnected by a LAN in a multiple processor environment commonly referred to as "enterprise" computing. While one factor motivating the development of enterprise computing has been the increased processing capability achievable by utilizing multiple processors to perform a task, another factor has been the desire to provide a computer capable of using software operable with different processor subsystems and/or operating systems. It should be readily appreciated that the ability to run software written for different operating systems, for example, the NT, OS2, UNIX and Windows systems, from a single workstation specially designed to be able to access an appropriate processor, for example, the Intel Pentium, DEC Alpha, Motorola Power PC and HP RISC, interconnected therewith would have a tremendous commercial advantage over a traditionally designed workstation.

Referring now to FIG. 1, a conventional, LAN-type interconnection between first and second computer systems will now be described in greater detail. A first computer system 10, typically housed within a first computer chassis 11 and physically located at a first location, is comprised of a local bus 15 configured for bi-directional exchanges of address, data and control signals between various components of the computer system 10 such as central processing unit (or "CPU") 14 and main memory 16. It should be clearly understood, however, that additional devices, for example, a memory controller for controlling exchanges between the CPU 14 and the main memory 16 and a cache that contains data and instructions obtained from main storage for next use by the CPU 14, typically reside on the local bus 15 of computer system such as the computer system 10 but have been omitted from FIG. 1 for ease of illustration.

Also residing on the local bus 15 is a peripheral connection interface (or "PCI") controller 18 which controls exchanges of address, data and control signals between devices residing on the local bus 15, for example, the CPU 14, and devices residing on a PCI bus 20 coupled to the local bus 15 by a bridge 22. Preferably, the PCI bus 20 should be a 32-bit wide bus having a transfer rate on the order of 33 MBytes per second. Residing on the PCI bus 20 are a main basic input output system (or "BIOS") 24 and plural peripheral devices. The main BIOS 24 is that portion of the disk operating system (or "DOS") which provides an interface between the DOS kernel and the underlying hardware. More specifically, the DOS kernel passes commands from application software to the main BIOS 24 for translation into hardware-specific requests. During start-up of the computer system 10, the main BIOS 24 is also responsible for initializing input/output (or "I/O") devices installed on the PCI bus 20. In some cases, however, an expansion BIOS (not shown) which resides on a particular I/O device installed on the PCI bus 20 is also required to initialize that particular device.

Also residing on the PCI bus 20 are plural peripheral devices such as an auxiliary memory 26, an addressable storage space, for example, a small computer system interface (or "SCSI") drive, which typically contains large amounts of data infrequently required by the CPU 14 and a display system 28, for example, a video monitor, which visually displays data. Finally, the PCI bus 20 includes a PCI interface 32 which, as will be more fully described below, is used to interconnect a first LAN device 58 to the PCI bus 20. It should be clearly understood, however, that the particular devices identified as residing on the PCI bus 20 are exemplary and that numerous other I/O and/or peripheral devices not specifically enumerated herein, for example, a printer, may also reside on the PCI bus 20.

A bridge 29 couples the PCI bus 20 with an industry standard architecture (or "ISA") bus 30. The ISA bus 30 is a 16-bit wide bus having plural expansion slots (not shown) in which additional devices, generally referred to as option cards (also not shown), may be inserted to augment the capabilities of the computer system 10.

Also illustrated in FIG. 1 is a second computer system 12 which, when coupled to the first computer system 10 in a manner to be more fully described below, may exchange address, data and control signals therewith. As illustrated herein, the second computer system 12 is housed within a second computer chassis 13, physically located at a second location and configured identically to the first computer system 10, i.e. the second computer system 12 is comprised of a local bus 40 on which a CPU 34, main memory 36 and PCI controller 38 reside, a PCI bus 42 on which a main BIOS 44, an auxiliary memory 46, a display system 48 and a PCI interface 50 used to interconnect a second LAN device 60 to the PCI bus 42 reside, an ISA bus 52, a bridge 54 which couples the local bus 40 and the PCI bus 42 and a bridge 56 which couples the PCI bus 42 and the ISA bus 52. It should be clearly understood, however, that the first and second computer systems 10 and 12 have been identically configured merely for ease of description and that it is specifically contemplated that the first and second computer systems 10 and 12 may be variously configured computer systems which differ as to either the particular components and/or devices installed on the local, PCI and ISA busses 40, 42 and 52 and/or as to the particular type of processor selected as the CPU 34.

Continuing to refer to FIG. 1, the interconnection between the first computer system 10 and the second computer system 12 which permits the exchange of address, data and control signals therebetween will now be described in greater detail. To interconnect the two, the first LAN device 58 is coupled to the PCI bus 20 of the first computer system 10 by inserting the first LAN device 58 into the PCI interface 32. The first LAN device 58 is comprised of data registers 62, first-in-first out (or "FIFO") data registers 64, a LAN controller 66 and a serial I/O port 68, all of which are interconnected with each other by internal interconnection circuitry 59, for example, a series of conductive leads. Similarly, a second LAN device 60 is coupled to the PCI bus 42 of the second computer system 12 by inserting the second LAN device 60 into the PCI interface 50. As illustrated herein, the first and second LAN devices 58 and 60 are identically configured, i.e., the second LAN device 60 is comprised of data registers 70, FIFO data registers 72, a LAN controller 74 and a serial I/O port 76 interconnected with each other by internal interconnection circuitry 61. It is specifically contemplated, however, that the first and second LAN devices 58 and 60 may be variously configured in a manner not illustrated herein. Finally, physical interconnection between the first computer system 10 and the second computer system 12 is achieved using a physical link 78 which connects the first serial I/O port 68 and the second serial I/O port 76. For example, the physical link 78 may be coaxial cable or twisted-pair wires.

The precise protocol by which address, data and control signals are exchanged between the first computer system 10 and the second computer system 12 using the first and second LAN devices 58 and 60 will vary depending on the particular LAN devices installed in the respective computer systems. For example, in accordance with one such protocol, if the CPU 14 of the first computer system 10 desired to issue an instruction to the CPU 34 of the second computer system 12, the PCI controller 18 would arrange for the transfer of the command to the data registers 62. The PCI controller 18 would then inform the LAN controller 66 of the transfer. Of course, if the information to be transferred from the first computer system 10 to the second computer system 12 required buffering, for example, due to the size of the information being transferred and the rate at which such information could be accepted at its ultimate destination, such information would be placed in the data FIFO 64 instead. In turn, the LAN controller 66 would then arrange for the transfer of the contents of the data registers 62 or data FIFO 64 to the CPU 34, for example, by arranging an interrupt of the CPU 34 followed by a transfer of the contents of the data registers 62 to the CPU 34 via the serial I/O port 68, the physical link 78, the serial I/O port 76, the PCI bus 42 and the local bus 40. Of course, the transfer of address, data and control signals from the second computer system 12 to the first computer system 10 would be achieved in the reverse manner, i.e. by transferring the information into either the data registers 70 or the data FIFO 72, notifying the LAN controller 74 of the transfer and having the LAN controller 74 arrange for the transfer of the information to its final destination via the serial I/O port 76, the physical link 78, the serial I/O port 68 and the PCI bus 20.

It will be readily appreciated by one skilled in the art that, while the interconnection of the first and second computer systems 10 and 12 using the physical link 78 and the first and second LAN devices 58 and 60 illustrated in FIG. 1 may permit the CPU 14 to utilize the CPU 34 to perform multiple processor tasks including the execution of software written for a different processor type, numerous shortcomings in the illustrated interconnection of the first and second computer systems 10 and 12 limit its usefulness as a multiple processor computer system. In particular, the serial interconnection between the first and second computer systems 10 and 12 severely limit the rate at which information may be transferred between the systems. Furthermore, plural redundant devices make the multiple processor system achieved by the interconnection of the first and second computer systems 10 and 12 unnecessarily expensive.

It can be readily seen from the foregoing that it would be desirable to provide a simple and inexpensive multiple processor computing system capable of executing software designed for use in various platforms and/or operating systems. It is, therefore, the object of this invention to provide such a multiple processor type computing system.

SUMMARY OF THE INVENTION

In one embodiment thereof, the present invention is of a multiple processor type computing system which includes a first PCI bus, a first processor subsystem coupled to the first PCI bus, a second PCI bus, a second processor subsystem coupled to the second PCI bus and an interface device coupled to the first PCI bus and the second PCI bus which includes circuitry for controlling bi-directional exchanges of address, data and control signals between the first processor subsystem and the second processor subsystem. In one aspect thereof, the interface device includes a first PCI interface coupled to the first PCI bus, a second PCI interface coupled to the second PCI bus and first and second memory devices, each of which are coupled to the first PCI interface and the second PCI interface. The first memory device holds address, data and control signals being transferred from the first processor subsystem to the second processor subsystem while the second memory device holds address, data and control signals being transferred from the second processor subsystem to the first processor subsystem. In another aspect thereof, the interface device further includes a controller circuit, preferably, a LAN controller, which arranges the transfer of address, data and control signals placed in the first memory device by the first processor subsystem to the second processor subsystem and the transfer of address, data and control signals placed in the second memory device by the second processor subsystem to the first processor subsystem.

In alternate aspects of this embodiment of the invention, the first and second memory devices may be first and second data registers or first and second data FIFOs, or, by further including third and fourth memory devices as part of the interface device, both. In yet another aspect thereof, the interface device further includes a first controller circuit, preferably, a first LAN controller, which arranges the transfer of address, data and control signals placed in the first memory device by the first processor subsystem to the second processor subsystem and a second controller circuit, preferably, a second LAN controller, which arranges the transfer of address, data and control signals placed in the second memory device by the second processor subsystem to the first processor subsystem.

In another embodiment thereof, the present invention is of a multiple processor type computing system comprised of a computer chassis, a plurality of electronic components positioned in the computer chassis and at least one peripheral device positioned outside of the computer chassis and coupled to a first PCI bus supportably mounted within the chassis. The plurality of electronic components include a first local bus to which a first processor, a first main memory and a first PCI controller are coupled and a second local bus to which a second processor, a second main memory and a second PCI controller are coupled. In addition, the first local bus is coupled to a first PCI bus on which at least one peripheral device, an ISA bus and a first PCI interface reside while the second local bus is coupled to a second PCI bus on which a second PCI interface resides. An interface device which includes a first memory device, a second memory device, a first LAN controller and a second LAN controller is coupled to the first and second PCI interfaces, thereby joining the first and second processors. The first memory device holds address, data and control signals to be transferred from the first processor to the second processor under the control of the first LAN controller while the second memory device holds address, data and control signals being transferred from the second processor to the first processor under the control of the second LAN controller.

In one aspect of this embodiment of the invention, the interface device further include third and fourth memory devices, each coupled to the first and second PCI interfaces, the first and second memory devices and the first and second LAN controllers. In this aspect, the third memory device holds selected ones of the address, data and control signals being transferred from the first processor to the second processor while the fourth memory device holds selected ones of the address, data and control signals being transferred from the second processor to the first processor. Preferably, the first memory device is a first data register, the second memory device is a second data register, the third memory device is a first data FIFO and the fourth memory device is a second data FIFO.

In another aspect of this embodiment of the invention, the first processor is configured to execute software which utilizes a first operating system while the second processor is configured to execute software which utilizes a second operating system, thereby enabling the multiple processor computing system to handle different types of software.

In still another embodiment thereof, the present invention is of a method of manufacturing a multiple processor computing system having first and second processors. First and second computer systems, each having a PCI bus, a processor coupled to the PCI bus and a LAN device coupled to the PCI bus, are provided. Each of the provided LAN devices includes a serial I/O port for interconnecting the LAN device with a network, internal logic, and at least one internal connector which couples the serial I/O port and the internal logic. The serial I/O port is removed from each of the LAN devices to expose the internal connectors thereof. The first and second processors are then coupled together by interconnecting the internal connectors of the first and second LAN devices. In one aspect thereof, each of the provided processors are configured to execute software utilizing a different operating system. In another aspect thereof, the first and second computer systems coupled by the interconnection between the first and second LAN devices are supportably mounted within a provided computer chassis and, in yet another aspect thereof, a provided peripheral device is then coupled to the PCI bus of the first computer system such that the peripheral device may then be used by both the first and second computer systems.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 2:
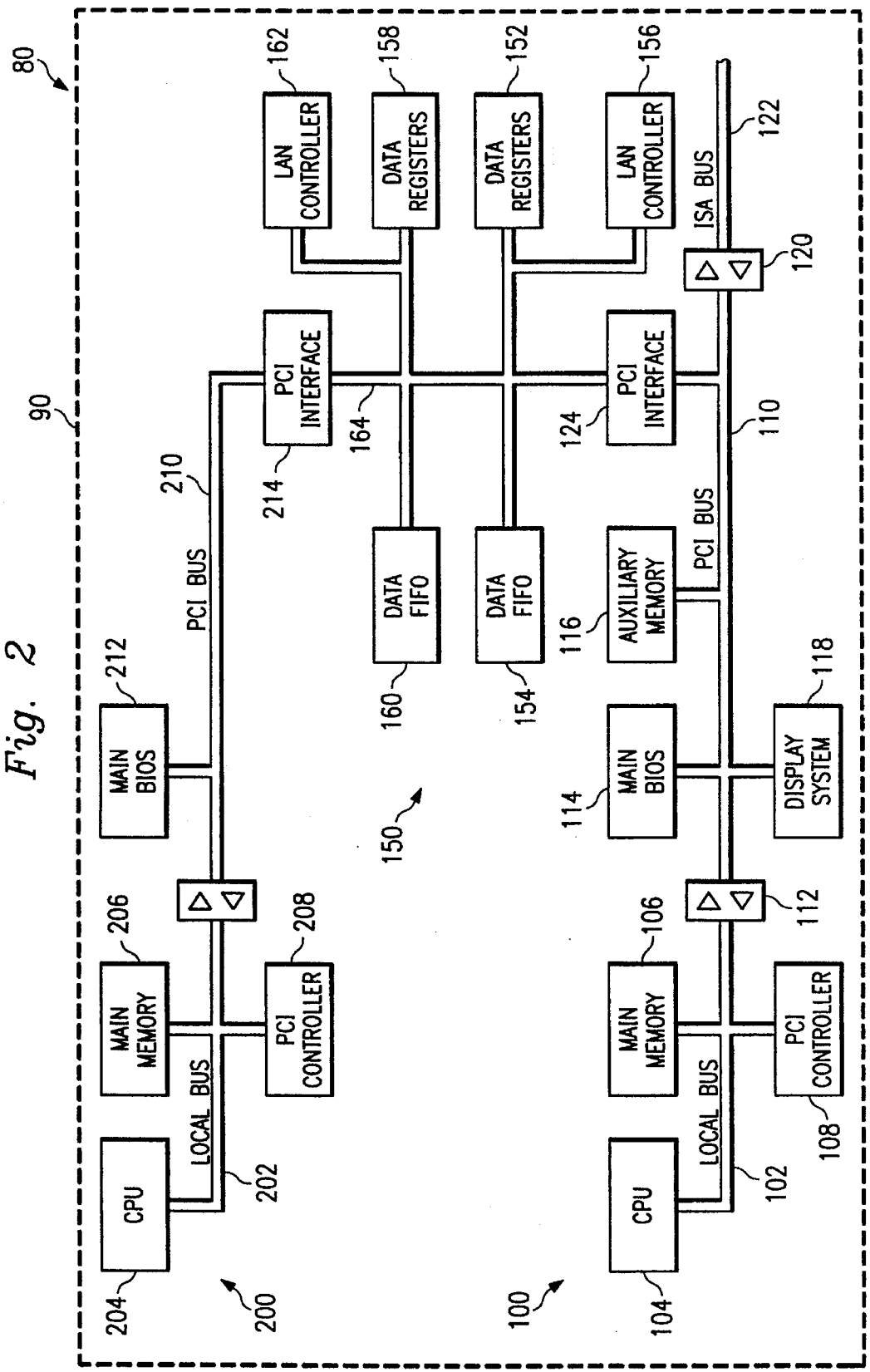
FIG. 2 is a block diagram of a multiple processor computing system constructed in accordance with the teachings of the present invention and comprised of first and second computer systems housed within a single computer chassis and interconnected using an interface device formed by connecting a pair of specially modified LAN devices.

Referring now to FIG. 2, a multiple processor computing system constructed in accordance with the teachings of the present invention and comprised of first and second computer systems, each preferably configured to execute software which utilizes a different operating system, and an associated apparatus for interconnecting the first and second computer systems using a pair of specially modified LAN devices will now be described in greater detail. More specifically, a multiple processor computing system 80 is comprised of a first computer system 100 and a second computer system 200 supportably mounted within a common computer chassis 90 and coupled together by an interface device 150 to be more fully described below. While, in one embodiment thereof, it is contemplated that the first and second computer systems 100 and 200 are selected to have a common operating system, for example, by selecting identically configured processors such as the Intel Pentium 100 processor, it is preferred that the computer systems 100 and 200 are selected such that each utilizes a different operating system. For example, the first computer system 100 may include the Intel Pentium 100 processor while the second computer system may include the DEC Alpha, Motorola Power PC, the HP RISC or any other commercially available processor. In this embodiment of the invention, however, each one of the pair of processors should know appropriate ones of the commands recognizable by the other of the processor pair so that it may issue desired instructions thereto.

The first computer system 100 includes a local bus 102 for bi-directional exchanges of address, data and control signals between various components of the first computer system 100 such as central processing unit (or "CPU") 104 and main memory 106. It should be clearly understood, however, that additional devices, for example, a memory controller for controlling exchanges between the CPU 104 and the main memory 106 and a cache that contains data and instructions obtained from main storage for next use by the CPU 104, typically reside on the local bus 102 of a computer system such as the first computer system 100 but have been omitted from FIG. 2 for ease of illustration.

Also residing on the local bus 102 is a PCI controller 108 which controls exchanges of messages between devices residing on the local bus 102, for example, the CPU 104, and devices residing on a PCI bus 110 coupled to the local bus 102 by a bridge 112. Preferably, the PCI bus 110 should be a 32-bit wide bus having a transfer rate on the order of 33 MBytes per second. Residing on the PCI bus 110 are a main BIOS 114 and plural peripheral devices. The main BIOS 114 is that portion of the DOS which translates commands received from application software into hardware-specific requests and which, during start-up of the first computer system 100, is responsible for initializing I/O devices installed on the expansion bus. In some cases, however, an expansion BIOS (not shown) which resides on a particular I/O device (also not shown) installed on the PCI bus 110 is also required to initialize that particular device.

Also residing on the PCI bus 110 are plural peripheral devices such as an auxiliary memory 116, an addressable storage space, for example, a small computer system interface (or "SCSI") drive, which typically contains large amounts of data infrequently required by the CPU 104 and a display system 118, for example, a video monitor, which visually displays data. Finally, the PCI bus 110 includes a PCI interface 124 which, as more fully described below, is used to interconnect the first computer system 100 to the second computer system 200 using a modified LAN device. It should be clearly understood, however, that the particular devices identified as residing on the PCI bus 110 are exemplary and that numerous other I/O and/or peripheral devices not specifically enumerated herein, for example, a printer, may also reside on the PCI bus 110.

A bridge 120 couples the PCI bus 20 with a 16-bit ISA bus 122 having plural expansion slots (not shown) in which devices, generally referred to as option cards, (also not shown) may be inserted to augment the capabilities of the first computer system 100.

As previously set forth, also supportably mounted within the computer chassis 90 is the second computer system 200 which, when coupled to the first computer system 100 in a manner to be more fully described below, may exchange address, data and control signals therewith. The second computer system 200 is comprised of a local bus 202 on which a CPU 204, main memory 206 and PCI controller 208 reside, a PCI bus 210 on which a main BIOS 212 and a PCI interface 214 used to interconnect the second computer system 200 with the first computer system 100 in a manner to be more fully described below reside.

Figure 1:
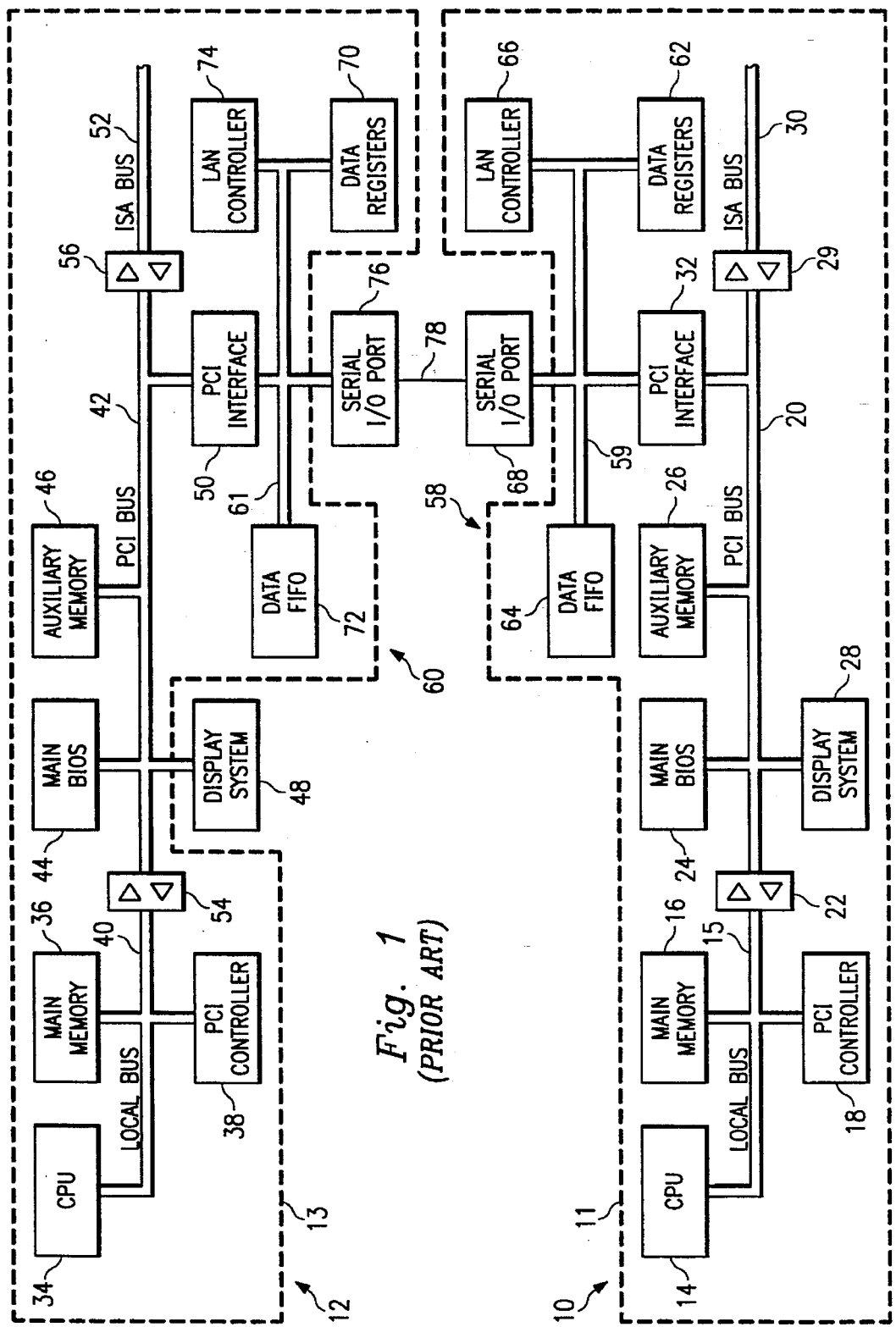
FIG. 1 is a block diagram of first and second computer systems housed within respective computer chassis and interconnected using a physical link which connects first and second conventionally designed LAN devices.

As may now be readily seen, the multiple processor computing system 80 comprised of the first computer system 100 coupled with the second computer system 200 within the common housing 90 will achieve considerable cost savings when compared to the LAN interconnected first and second computer systems 10 and 12 illustrated in FIG. 1. Specifically, numerous peripheral and I/O devices, all of which would add considerably to the cost of the computer system 200 and would typically reside on PCI bus 210 for use by the CPU 204, are no longer needed when the second computer system 200 is no longer a stand-alone computer system networked with the first computer system 100. Instead, when the first and second computer systems 100 and 200 are housed together, the CPU 204 may issue appropriate instructions via the PCI interface 214 to the peripheral and/or I/O devices residing on the PCI bus 110 of the first computer system 100 to have those devices perform desired tasks. Similarly, the CPU 204 may use the option cards or other devices residing on the ISA bus 122, thereby eliminating the need for a separate ISA bus for the second computer system 200.

The first and second computer systems 100 and 200 are interconnected by modifying first and second LAN devices, for example, the first and second LAN devices 58 and 60 illustrated in FIG. 1, respectively coupled to the first and second PCI interfaces 124 and 214. Of course, the first and second LAN devices 58 and 60 should not remain connected by the physical link 78 when beginning the modification thereof. More specifically, to make the first and second LAN devices 58 and 60 suitable for the uses disclosed herein, internal interconnection circuitry 59 of the first LAN device 58 is exposed by removing the serial I/O port 68 from the first LAN device 58. Similarly, the internal interconnection circuitry 61 of the second LAN device 60 is exposed by removing the serial I/O port 76 of the second LAN device 60. Next, the internal interconnection circuitry 59 is electrically connected to the internal interconnection circuitry 61 to both form the interface device 150 and join the first and second computer systems 100 and 200 as the multiple processor computing system 80.

Continuing to refer to FIG. 2, the interface device 150 produced by joining two LAN devices such as the first and second LAN devices 58 and 60 in the above-described manner will now be described in greater detail. The interface device 150 is comprised of first data registers 152, a first data FIFO 154, a first LAN controller 156, second data registers 158, a second data FIFO 160, a second LAN controller 162 and internal interconnection circuitry 164 which both couples the first and second data registers 152 and 158, the first and second data FIFOs 154 and 160 and the first and second LAN controllers 156 and 162 to each other and to the first PCI interface 124 and the second PCI interface 214.

Having completed the interconnection of the two, address, data and control signals may be exchanged between the first computer system 100 and the second computer system 200 in the following manner. If the CPU 104 of the first computer system 100 desired to issue an instruction to the CPU 204 of the second computer system 200, the PCI controller 108 would arrange for the transfer of the command to the first data registers 152 of the interface device 150. The PCI controller 108 would then inform the first LAN controller 156 of the transfer. Of course, if the information to be transferred from the first computer system 100 to the second computer system 200 required buffering, for example, due to the size of the information being transferred and the rate at which such information could be accepted at its ultimate destination, such information would be placed in the first data FIFO 156 instead. In turn, the first LAN controller 156 would then arrange for the transfer of the contents of the data registers 152 or data FIFO 154 to the CPU 204, for example, by arranging an interrupt of the CPU 204 followed by a transfer of the contents of the data registers 152 or data FIFO 154 out of the second PCI interface 214 and to the CPU 204 via the PCI bus 210 and the local bus 202. Of course, the transfer of address, data and control signals from the second computer system 200 to the first computer system 100 would be achieved in the reverse manner, i.e. by transferring the information into either the second data registers 158 or the second data FIFO 160, notifying the second LAN controller 162 of the transfer and having the second LAN controller 162 arrange for the transfer of the information out the first PCI interface 124 and on to its final destination via the PCI bus 110.

In an alternate embodiment of the invention not illustrated in FIG. 2, the LAN controller 74 of the second LAN device 60 may also be removed before electrically connecting the internal interconnection circuitry 61 with the internal interconnection circuitry 59 to manufacture the interface device 150. In such an embodiment, it is contemplated that the first LAN controller 156 would also arrange for transfers of address, data and control signals from the second computer system 200 to the first computer system 100. However, while such a configuration would reduce the cost of the multiple processor computing system 80 by removing the second LAN controller 162 from the interface device 150, such a reduction in cost would likely be offset by the steps added to the manufacturing process as well as the potential need to reprogram the first LAN controller 156 to arrange for transfers of address, data and control signals in both, rather than a single, directions.

Thus, there has been described and illustrated herein, a multiple processor computing system which inexpensively combines first and second computer systems, preferably using processors from different manufacturers, using an interface device manufacturable by specially modifying existing LAN devices which commonly reside on networked computer systems. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A multiple processor computing system, comprising:
   a first PCI bus;
   a first processor subsystem coupled to said first PCI bus;
   a second PCI bus;
   a second processor subsystem coupled to said second PCI bus;
   an interface device coupled to said first PCI bus and said second PCI bus, said interface device including:
      a first memory device, said first memory device holding address, data and control signals being transferred from said first processor subsystem to said second processor subsystem;
      a second memory device, said second memory device holding address, data and control signals being transferred from said second processor subsystem to said first processor subsystem;
      a LAN controller, said LAN controller controlling bi-directional exchanges of address, data and control signals between said first processor subsystem and said second processor subsystem via said first PCI bus, said interface device and said second PCI bus by arranging the transfer of address, data and control signals placed in said first memory device by said first processor subsystem to said second processor subsystem and the transfer of address, data and control signals placed in said second memory device by said second processor subsystem to said first processor subsystem.

2. A multiple processor computing system according to claim 1 wherein interface device further comprises:
   a first PCI interface coupled to said first PCI bus and said LAN controller;
   a second PCI interface coupled to said second PCI bus and said LAN controller;
   a first memory device coupled to said LAN controller, said first PCI interface and said second PCI interface, said first memory device holding address, data and control signals being transferred from said first processor subsystem to said second processor subsystem; and
   a second memory device coupled to said LAN controller, said first PCI interface and said second PCI interface, said second memory device holding address, data and control signals being transferred from said second processor subsystem to said first processor subsystem, said controller circuit arranging the transfer of address, data and control signals placed in said first memory device by said first processor subsystem to said second processor subsystem and the transfer of address, data and control signals placed in said second memory device by said second processor subsystem to said first processor subsystem.

3. A multiple processor computing system according to claim 1 wherein said first memory device is a first data register and said second memory device is a second data register.

4. A multiple processor computing system according to claim 1 wherein said first memory device is a first data FIFO and said second memory device is a second data FIFO.

5. A method of manufacturing a multiple processor computing system having a first processor and a second processor, comprising the steps of:
   providing a first computer system having a first PCI bus, a first processor coupled to said first PCI bus and a first LAN device coupled to said first PCI bus, said first LAN device having a serial I/O port for interconnecting said first LAN device with a network, internal logic, and at least one internal connector which couples said serial I/O port and said internal logic;
   removing said serial I/O port from said first LAN device to expose said at least one connector;
   providing a second computer system having a second PCI bus, a second processor coupled to said second PCI bus and a second LAN device coupled to said second PCI bus, said second LAN device having a serial I/O port for interconnecting said second LAN device with a network, internal logic, and at least one internal connector which couples said serial I/O port and said internal logic;
   removing said serial I/O port from said second LAN device to expose said at least one connector; and
   interconnecting said at least one connector exposed by removing said serial I/O port from said first LAN device with said at least one connector exposed by removing said serial I/O port from said second LAN device to couple said first computer system with said second computer system as a multiple processor computing system.

6. A method of manufacturing a multiple processor computing system according to claim 5 wherein said first processor is configured to execute software which utilizes a first operating system and said second processor is configured to execute software which utilizes a second operating system.

7. A method of manufacturing a multiple processor computing system according to claim 6 and further comprising the steps of:

providing a computer chassis; and supportably mounting said first computer system and said second computer system within said computer chassis.

8. A method of manufacturing a multiple processor computing system according to claim 7 and further comprising the steps of:

providing a peripheral device; and coupling said peripheral device to said first PCI bus;

wherein said peripheral device may be used by both said first processor and said second processor.

* * * * *